United States Patent
Allen et al.

(10) Patent No.: US 6,643,586 B2
(45) Date of Patent: Nov. 4, 2003

(54) SYSTEM AND METHOD TO DETERMINE FIBRE CHANNEL DEVICE LOCATIONS USING GPS

(75) Inventors: James P. Allen, Austin, TX (US);
Marcus Bryan Grande, Pflugerville, TX (US); Madhuranath Narasipur Krishna Iyengar, Austin, TX (US);
Robert G. Kovacs, Austin, TX (US);
John Leslie Neemidge, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/015,279

(22) Filed: Dec. 17, 2001

(65) Prior Publication Data

US 2003/0114981 A1 Jun. 19, 2003

(51) Int. Cl.[7] .................. G08G 1/123; G01C 21/20; H04M 3/42
(52) U.S. Cl. ................. 701/213; 701/300; 342/357.09
(58) Field of Search .................. 701/213, 300, 701/207, 214; 342/357.09; 455/461, 466, 456; 340/988, 989

(56) References Cited

U.S. PATENT DOCUMENTS

| | | | | |
|---|---|---|---|---|
| 6,236,652 B1 | * | 5/2001 | Preston et al. | 370/349 |
| 6,295,502 B1 | * | 9/2001 | Hancock et al. | 701/201 |
| 6,321,091 B1 | * | 11/2001 | Holland | 455/456 |
| 6,327,535 B1 | * | 12/2001 | Evans et al. | 701/300 |
| 6,331,825 B1 | * | 12/2001 | Ladner et al. | 340/988 |
| 6,405,035 B1 | * | 6/2002 | Singh | 455/414 |
| 6,421,608 B1 | * | 7/2002 | Motoyama et al. | 701/213 |

* cited by examiner

*Primary Examiner*—Tan Q. Nguyen
*Assistant Examiner*—Dalena Tran
(74) *Attorney, Agent, or Firm*—Joseph T. Van Leeuwen; Mark E. McBurney

(57) ABSTRACT

A GPS device is used in conjunction with a device, such as a SAN device, to record and track the device's location. A device can periodically report its location to one or more computer systems that track device locations. Another device can send a request to other devices requesting the devices' geographic location. The devices, in turn, respond with data corresponding to their geographic location. In the event of a catastrophe or other event rendering devices in one area inoperable, one of the computer systems can be used to identify a location of another device that includes similar data. The GPS data corresponding to a device can also be used to identify a technician that should respond to a device maintenance or repair event.

23 Claims, 8 Drawing Sheets

SYSTEM AND METHOD TO DETERMINE FIBRE CHANNEL DEVICE LOCATIONS USING GPS

BACKGROUND OF THE INVENTION

1. Technical Field

The present invention relates in general to a method and system for using a Fibre Channel. More particularly, the present invention relates to a system and method for tracking Fibre Channel devices with GPS technology.

2. Description of the Related Art

Data Storage has become an increasingly important issue for business people and IT professionals. Organizations store records in databases regarding customers, products, competitors, and other records. This storage space becomes expensive when more data is stored. These expenses can be potentially prohibitive for small businesses who must employ people to manage the data, purchase storage equipment and software, and ensure that the data is properly protected from disaster or storage device failure. A solution to this problem comes in the form of an emerging technology called Fibre Channel. Fibre Channel can be used to connect devices to each other, including connecting computer systems to storage devices such as SAN devices.

Fibre Channel is a high speed (100 to 1000 Mbps currently, with speeds increasing quickly over time) medium used for data transfer and storage. It is essentially a serial data channel preferably created over fiber optic cabling. Fibre Channel provides a logical bi-directional, point-to-point connection between a host and a device. Similar to networking technologies using local area network (LAN) or wide area network (WAN) configurations, Fibre Channel also is used to connect PCs, servers, printers, and storage devices. Because Fibre Channel allows the use of fiber optic cabling, connections along a Fibre Channel network makes it possible to transfer data at greater distances. In addition, Fibre Channel makes high-speed data transfers possible. Fibre Channel also provides increased bandwidth over communication channels.

Channels and networks are the two primary ways that data is transferred between devices. Such devices include processors and peripherals such as printers and storage devices. Channels transfer data through switched or direct point to point connections. Channels work by creating a fixed connection between the source and destination devices until the transfer is complete. Channels transfer data at high speeds and are very economical. Networks (i.e., LAN or WAN), on the other hand are collections of nodes such as processors, print devices, and workstations. Connections on networks are typically slower than those made via channels. Also, because networks are software intensive, they are much more expensive due to upgrade and compatibility issues. Channels work best among few devices and connect via predefined addresses. Networks, on the other hand, can handle multiple requests among multiple connections.

Fibre Channel is hybrid of both network and channel methods. Consequently, Fibre Channel is often considered a new I/O (input/output) interface that combines the best of networks and channels. In addition, Fibre Channel systems can be configured in different ways depending on needs of the user, thus providing flexibility in an ever changing systems environment.

Although the ideal medium for Fibre Channel is fiber optic cabling, Fibre Channel can also be used with a variety of cable types such as copper, coaxial cables or Unshielded twisted pair (UTP) wires. Fiber optic cabling is generally preferred on a Fibre Channel system for purposes of increased speed and reliability. Fiber optic cabling works by using photons to transmit digital signals. A laser light connected to a device pulses in binary format (0's and 1's). A light emitting diode (LED) codes and transmits the signal from one end of the cable. This signal is subsequently decoded at the other end of the cable by a photo-detector connected to the receiving device. Fiber optic cables do not have the same challenges that are associated with copper cabling. These challenges include attenuation (loss of signal strength) and noise. Fiber optic cables are also more secure than copper cables because crosstalk does not occur with Fiber Optic cables (crosstalk is interference caused by a signal transferring from one circuit to another, as on a telephone line). This insures that data being transferred across a network gets to its destination intact which makes the stored data more reliable for the user.

Fibre Channel technology makes use of classes of service to define messaging types (communication between devices). According to the ANSI standard, a Fibre Channel system's classes of service can be 1, 2, 3, 4 or 6. These classes make it possible to configure Fibre Channel systems according to the needs of the users.

In a class 1 configuration, there is a dedicated channel between two connection devices. In this configuration, if a host and a device are connected, no other host uses the connection. The advantage of using service class 1 is speed and reliability which is an excellent combination for mass storage use such as in a data library. Class 2 is known as a "connectionless" service. Class 2 provides a frame-switched link that guarantees delivery of packets from device to device. It also provides packet receipt acknowledgments. In this configuration, bandwidth is shared among several devices, as there is no dedicated link. The third Fibre Channel service class (Class 3) is called "unacknowledged connectionless service" and is often used for messages that do not need to be acknowledged, as there is no acknowledgement with a Class 3 configuration. Class 4 is called "fraction bandwidth connection oriented" and allows a device to reserve a portion of the overall bandwidth and use the reserved portion to create a dedicated channel between devices (similar to Class 1, except only part of the available bandwidth is used for the dedicated channel). Class 6 is called "multicast" and is used for one-to-many broadcast communications over the Fibre Channel network. There is an additional Fibre Channel service class called "intermix," which creates a dedicated connection like that of class one, but it also allows class 2 traffic to access the link. This method is efficient and allows for greater bandwidth because more than one connection can access the system at any time.

The Fibre Channel Structure, or architecture, is set forth in the table below. The layers in the table represent a different function that exists within a Fibre channel system.

| Layer | Function |
| --- | --- |
| FC-0 | Physical characteristic specifications |
| FC-1 | Encoding/Decoding |
| FC-2 | Data Transfer Sequence Management/Data Framing |
| FC-3 | Bandwidth Management |
| FC-4 | Application/Protocol Management |

Storage Area Networks are increasing in popularity due to high demand by users who need to store large volumes of data. In addition, the cost of magnetic media that comprise Storage Area Networks continues to fall, thus making large data networks both attractive and feasible. The data in a Storage Area Network might be used in data warehouses or decision support systems used by businesses. There are also new applications for Storage Area Networks such as fault tolerant RAID clusters. Storage Area Networks can operate using network interconnect devices such as SCSI, Fibre Channel, HIPPI, or Sonnet. A SAN is a group of storage devices connected via a network of connections to hosts machines across greater distances than are possible on a traditional LAN. Storage Area Networks enable users to store large volumes of data at remote locations. These remote locations, called libraries, make it possible for businesses to store their data, whether for the purpose of creating backups or moving data management away from the primary site. If used for storage, a SAN will typically contain many high capacity Redundant Arrays of Inexpensive Disks (RAID) devises configured for the specific interconnect device used on the SAN. Other types of data that can be stored on SAN devices include databases, video, and streaming media. On a Storage Area Network using a Fibre Channel interconnect, backups can be performed throughout the workday, thereby eliminating timely and costly after hours backups. Storage Area Networks eliminate bottlenecks that make it difficult to access data on traditional networks.

On a Fibre Channel loop or fabric, each device connected to the Fibre Channel interconnect has a node name (Node_Name) and one or more port names (Port_Names). The Node_Name and Port_Names are unique, 64-bit identifies assigned to the specific device, or node, and its ports. Node_Names and Port_Names are assigned so that no two nodes in the world have the same Node_Names and Port_Names. Together, the Node_Name and Port_Names are referred to as a devices World Wide Name (WWN).

The modern business environment has become more competitive and more complex. Companies store very important data regarding the business and its operations on storage devices such as SANs. Care is often taken to backup the data onto tapes or other backup media. In addition, redundant drives or computer systems can also be used to backup mission critical data. Catastrophes, however, often involve a large geographical area, such as a city or area of a country, that is affected by a natural disaster, war, or other calamitous event. Oftentimes, mission critical data and the corresponding backup data is stored in one geographical location. If a catastrophe occurs in the area, the organization may suffer an irreparable data loss.

In addition, organizational data is often needed by multiple locations. For example, an office in Atlanta may need to access data, through a Fibre channel network, that is stored in Dallas. If the Dallas data is unavailable, due to a catastrophe or other event, an alternative data where the same data is stored, such as Houston, may need to be accessed instead. A challenge, however, is managing data stored on devices connected to a Fibre channel network so that geographical considerations are managed in the event of a large scale catastrophe occurring at one location.

A global positioning system (GPS) has been developed to indicate a geographic position of a device (i.e., a GPS receiver) located somewhere on the globe. Located hundreds of miles above the earth, GPS uses satellites to triangulate a traveler's location and determine the exact location of the traveler on the earth within a few feet. GPS devices have been developed and placed in automobiles, airplanes, and hand-held devices to assist people while traveling across the earth. The devices determine the distance from satellites and triangulate the data to determine a geographic coordinate. Devices can then transpose other known structures, such as highways, cities, and points of interest to orient the user using a graphical display.

Consequently, what is needed is a system and method for identifying and managing storage device locations interconnected on a computer network, such as SAN devices interconnected over a Fibre Channel topology.

SUMMARY

It has been discovered that a GPS device, or a technician carrying a GPS device, can be used in conjunction with a device, such as a SAN device, to record and track the device's location. In one embodiment, a device periodically reports its location, using an integrated GPS device, to one or more computer systems that track device locations. In another embodiment, a system sends a request to devices requesting the devices' geographic location. The devices, in turn, respond with data corresponding to their geographic location. The geographic location data is stored by the computer systems.

In the event of a catastrophe or other event rendering devices in one area inoperable, a computer system that previously gathered GPS data corresponding to devices on the network can be used to identify a location of another device that includes similar data. If a larger geographic area is subject to the catastrophic conditions, then a device in another location can be selected.

In another embodiment, the GPS data corresponding to a device location is used to determine which technician should respond to an outage event. In this embodiment, technicians use GPS devices to report their geographic positions. When a device is disabled, the computer system retrieves the disabled device's geographic location. The system then queries the geographic location of multiple technicians and determines which of the technicians is closest to the disabled device whereupon a dispatch message is transmitted to the closest technician.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
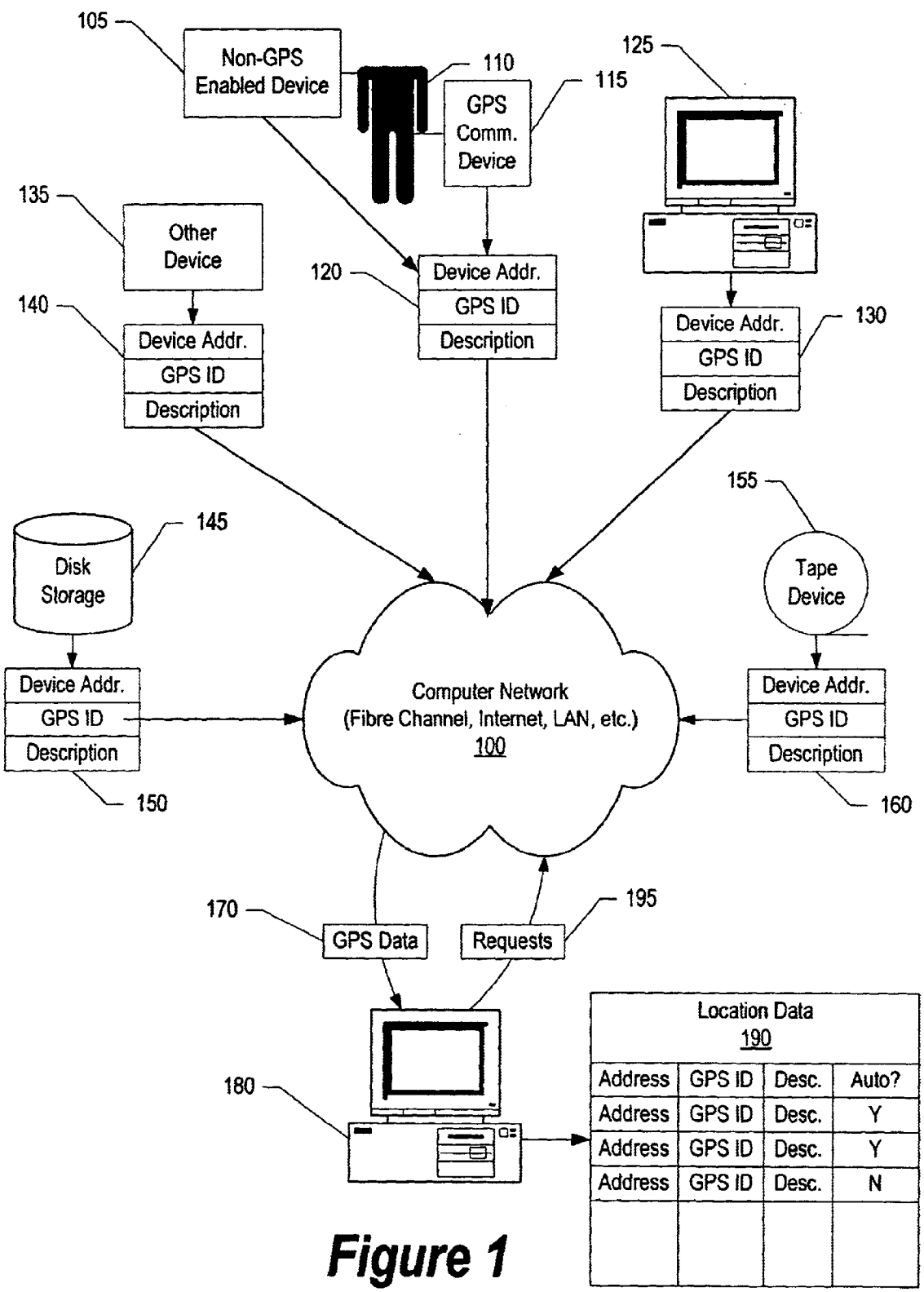
FIG. 1 is a high level network diagram of a system being managed using GPS information.

FIG. 1 is a high level network diagram of a system being managed using GPS information. Computer network 100, such as a Fibre Channel topology, the Internet, a local area network (LAN), wide area network (WAN), etc., is used to connect devices to one another. Computer system 180 is connected to computer network 100 and maintains device location data store 190. Device location data store may be stored in memory, nonvolatile storage (such as a disk or nonvolatile memory), or the like. As can be seen in FIG. 1, location data store 190 maintains data regarding a device's address, such as a network address of Fibre channel address, a GPS identifier that identifies the device's global geographic coordinates, a description of the device, and a flag indicating whether the device includes an integrated GPS receiver (i.e., Auto?="Y"), or whether a technician travels to the device with a separate GPS device to report the device's location (i.e., Auto?="N").

Computer system 180 sends requests 195 addressed to one or more devices. Requests 195 travel through computer network 100 which forwards the requests on to the individual devices. Non-GPS enabled device 105 does not have an integrated GPS device. Technician 110 is dispatched to non-GPS enabled device 105 along with portable GPS communication device 115. The technician retrieves the non-GPS device's location using the portable GPS communication device. The technician then transmits the device's address, the device's global geographic coordinates (GPS ID), and a description of the device in data packet 120. In one embodiment, non-GPS enabled device 105 requests its GPS coordinates from the technician. The technician provides the coordinates and the device then prepares data packet 120 and sends it to computer system 180. In another embodiment, the technician uses a portable device that may be integrated with the GPS device to enter the non-GPS enabled device information (i.e., address and description) whereupon packet 120 is prepared and sent via the portable device back to computer system 180.

GPS enabled devices gather global positioning data corresponding to the device, prepare the packets, and transmit the packets to computer system 180 without need of technician intervention. Computer system 125, disk storage device 145, tape device 155, and other device 135 are examples of GPS enabled devices. Disk storage device 145 may be a Storage Area Network (SAN) device or other storage device accessible by computer network 100. Disk storage device 145 often includes a specialized processor, such as a disk controller, used to manage the storage device. In addition, disk storage device 145 includes access to an integrated or nearby GPS device for retrieving its geographic coordinates. Disk storage device 145 also includes a network interface for receiving requests from computer network 100 and replying to such requests. When a GPS request is received, GPS enabled devices, such as computer system 125, other device 135, disk storage device 145, and tape device 155, respond by retrieving their global position coordinates, packaging the retrieved coordinates along with device address information and, optionally, a description of the device (i.e., the type of information being stored on a storage device, the type of system being operated on a computer system, etc.), and sending the packaged information (i.e., data packets 130, 140, 150, and 160) back to the requesting computer system in GPS data responses 170.

In one embodiment, multiple computer systems are used to retrieve and store GPS data corresponding to devices similar to computer system 180. In this manner, if one of the computer systems (such as computer system 180), is disabled due to a catastrophe, another computer system can be used that has a duplicate copy of the device GPS data. In another embodiment, device description data 190 is stored at more than one geographic location so that if one copy of the data is lost along with computer system 180, then another computer system can be used to retrieve the device description data and manage data needs following a catastrophe.

Figure 2:
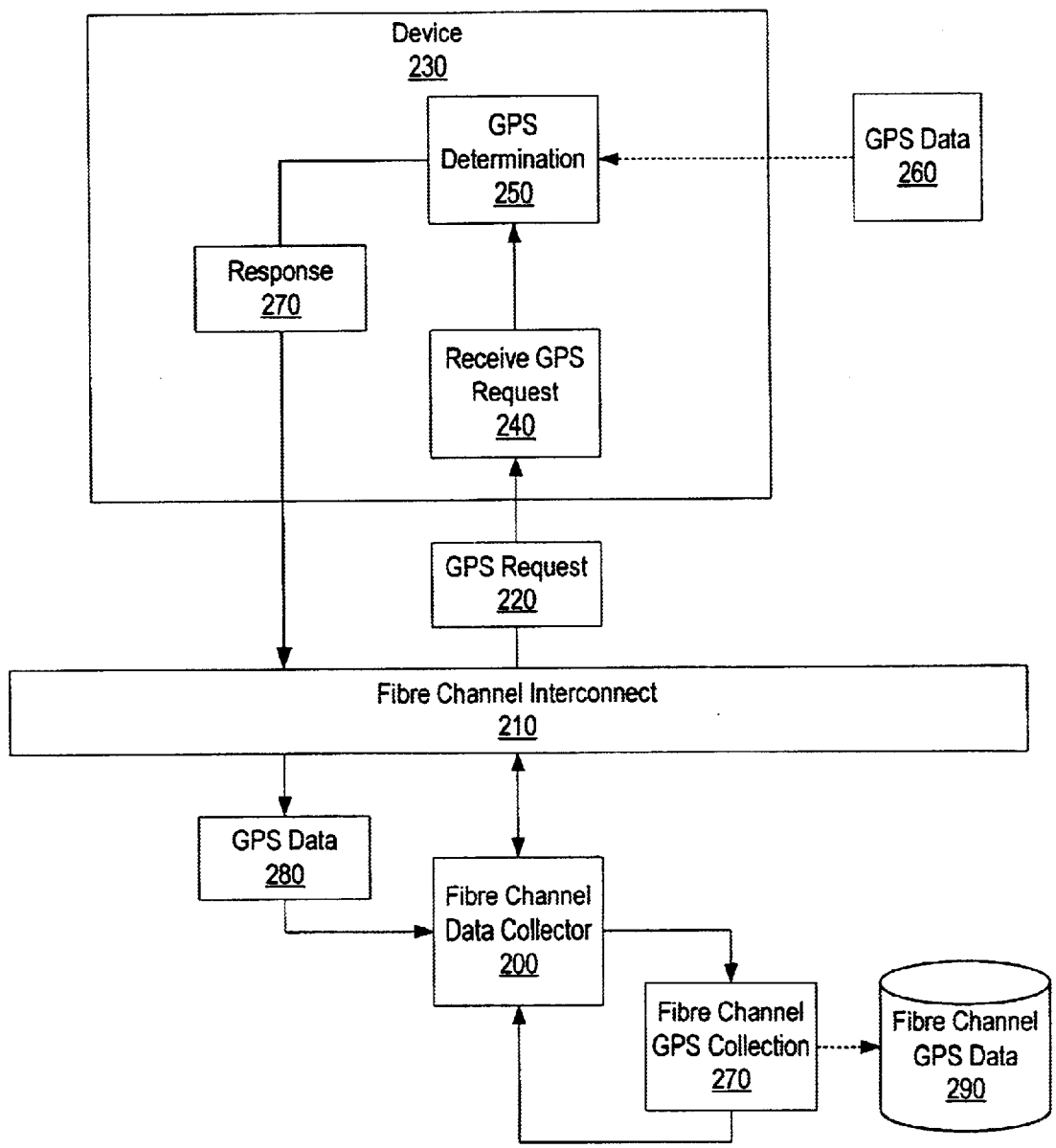
FIG. 2 is block diagram showing GPS device data being collected by a computer system.

FIG. 2 is block diagram showing GPS device data being collected by a computer system over a Fibre channel topology. Fibre Channel data collector 200 is connected to Fibre Channel interconnect 210, or other type of network. Fibre Channel data collector 200 sends GPS request 220 through Fibre Channel interconnect 210 to remote device 230.

Remote device 230 receives the GPS request using a Fibre Channel card or other network card if a Fibre Channel is not being used. The GPS request is received by the remote device (module 240). GPS determination (module 250) determines the geographic determination and receives GPS data 260. GPS data 260 may be received by a GPS receiver coupled to device 230 or may be provided by a technician or other process that provides the coordinate data upon request. Once the GPS data has been collected, it is packaged in response 270. Response 270 is sent back through Fibre Channel interconnect 210 whereupon GPS data 280 is received by Fibre Channel data collector 200. Fibre Channel GPS collection (module 270) stores the collected GPS data in Fibre Channel GPS data store 290. Fibre Channel GPS data store 290 is stored on a nonvolatile storage device, such as a hard disk or nonvolatile memory. Fibre Channel data collector 200 collects GPS data for many different devices such as device 230. The GPS data for each device is stored in Fibre Channel GPS data store 290 where it will be accessible upon the system encountering a catastrophe or other event that causes one or more devices to become disabled.

Figure 3:
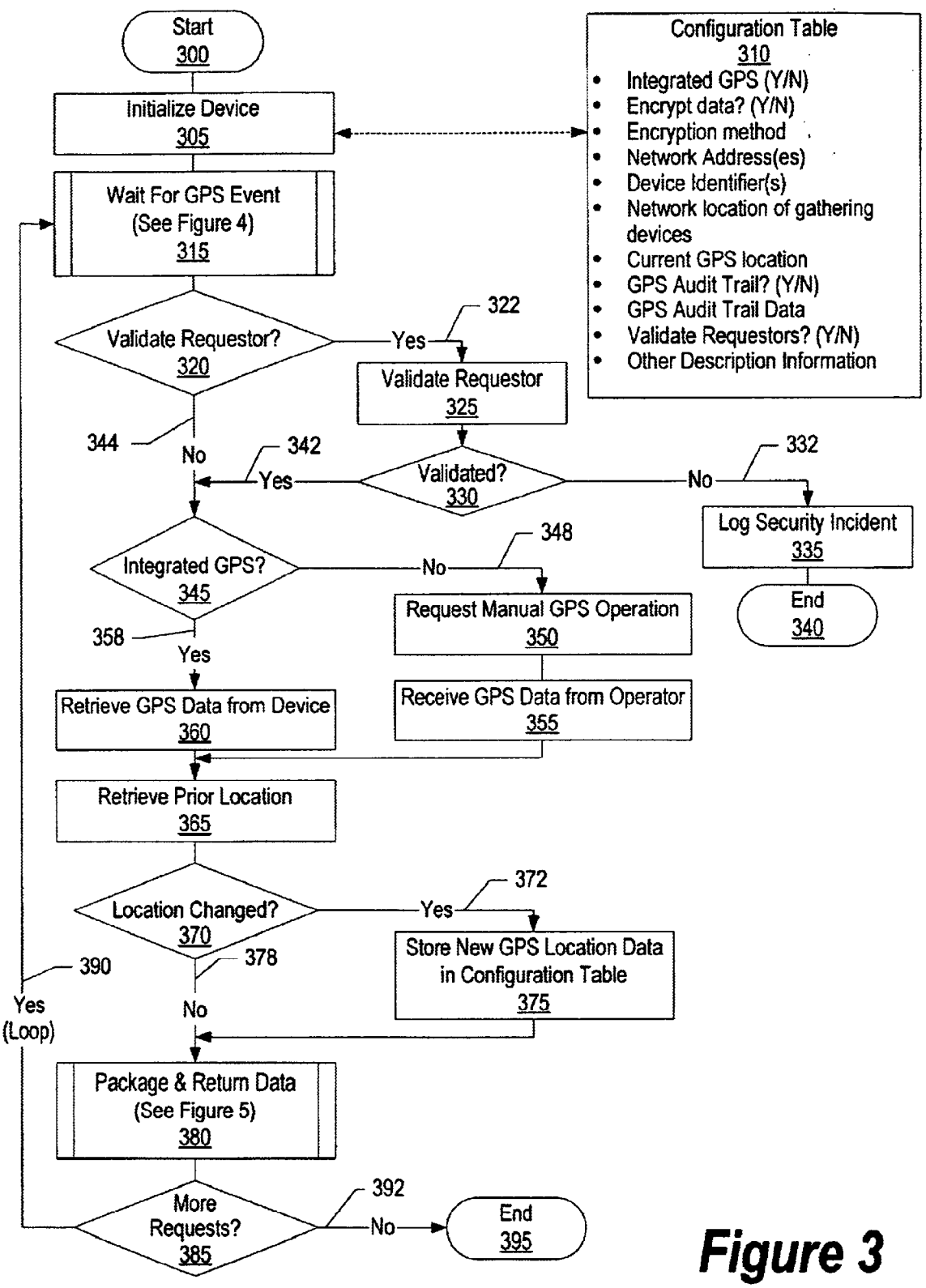
FIG. 3 is a flowchart of a device receiving GPS requests and responding accordingly.

FIG. 3 is a flowchart of a device receiving GPS requests and responding accordingly. Processing commences at 300 whereupon the device is initialized (step 305). Initialization may include storing and/or retrieving configuration data in configuration table 310. Configuration table 310 includes GPS related information as well as security information regarding communications. In the example shown, configuration table 310 includes a flag as to whether the device includes an integrated GPS device (i.e., whether a technician services GPS requests or whether the device can service GPS requests without technician intervention). A flag is also included indicating whether GPS information should be encrypted before being transmitted to the requestor(s). An encryption method is also included (i.e., public key/private key along with the public and private keys, shared key or password, etc.). The network address (i.e., Fibre channel address) is also included that uniquely identifies the device along with any additional device identifiers. Network locations of GPS gathering devices is included in order to compare against a requestor's address in order to validate the requestor. The device's current GPS positioning coordinates may also be included in the configuration data. These coordinates may be periodically compared with the device's actual GPS coordinates to determine whether the device has been moved. Upon movement of the device, the device could be programmed to inform one or more GPS data gathering devices. A flag is also included indicating whether a GPS audit trail is maintained along with GPS audit trail data when the option is enabled. A flag is also included indicating whether requestors are validated before GPS data is returned.

Figure 4:
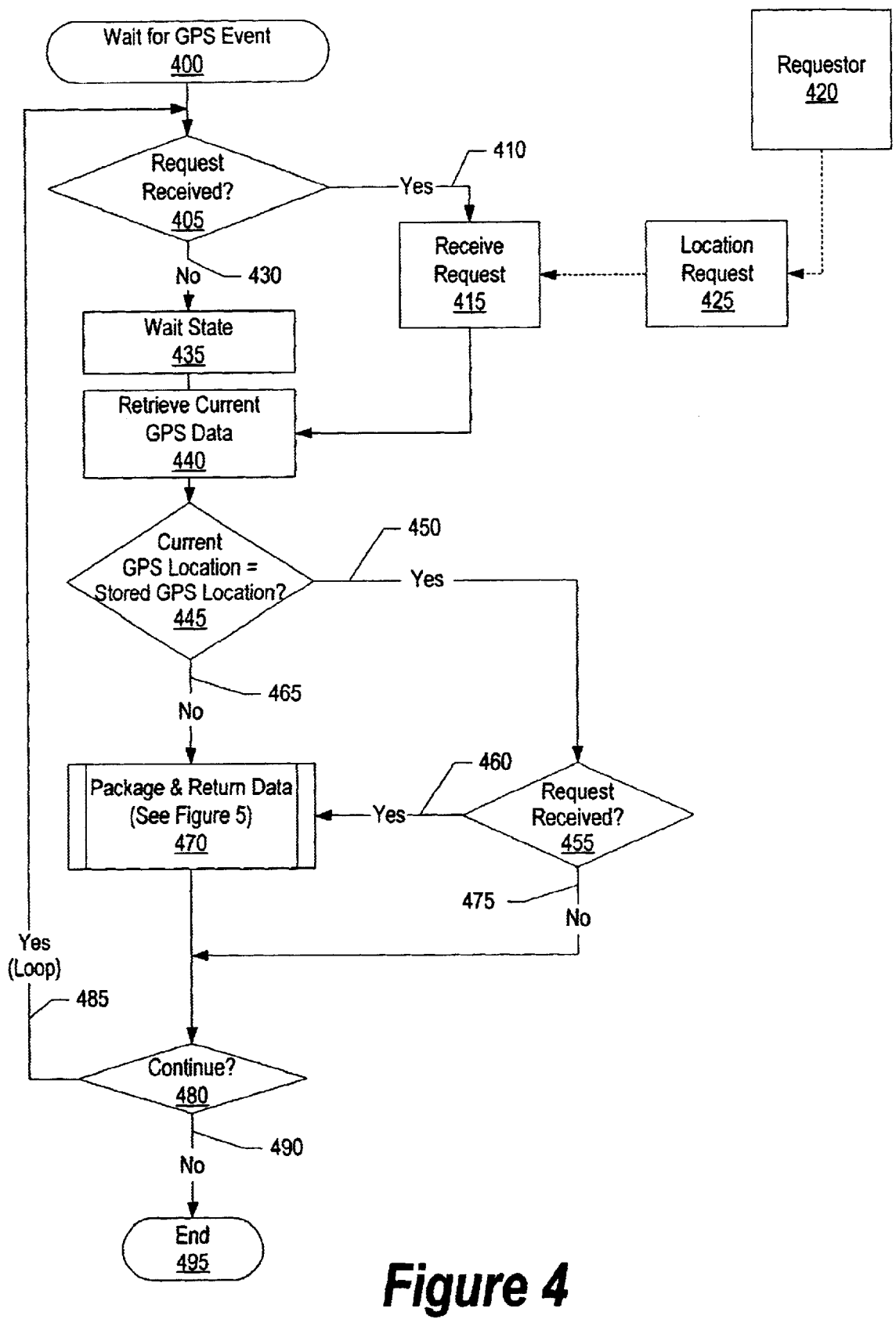
FIG. 4 is a flowchart of a device waiting for GPS events and replying with GPS data.

The device waits for a GPS event to occur (predefined process 315, see FIG. 4 for processing details). A determination is made, based on the configuration settings, as to whether a requestor that is requesting the device's GPS data should be validated (decision 320). If the device should be validated, decision 320 branches to "yes" branch 322 whereupon the requestor is validated (step 325). In one embodiment, the requestor's identity is verified using a digital signature or digital certificate corresponding to the requester. In another embodiment, the requestor's address is compared with network addresses of GPS data gathering devices stored in configuration table 310. In yet another embodiment, the requestor's address is compared by searching a file stored on a common data storage area, the address of which is stored in configuration table 310.

A determination is made as to whether the requester was validated (decision 330). If the requester was not validated, decision 330 branches to "no" branch 332 whereupon a security incident is logged (step 335) in a security file indicating that an unauthorized device attempted to retrieve the device's GPS position information and processing thereafter ends at 340. On the other hand, if the requester was validated, decision 330 branches to "yes" branch 342 and processing continues.

If requesters are not validated (decision 320 branches to "no" branch 344) or if the request was successfully validated (decision 330 branches to "yes" branch 342), then processing continues whereupon a determination is made as to whether the device includes an integrated GPS device (decision 345). If the device does not include an integrated GPS device, decision 345 branches to "no" branch 348 whereupon a message is sent to a technician requesting manual GPS intervention (step 350). The technician travels to the device with a mobile GPS device and determines the device's GPS coordinates which are entered by the technician into the device (step 355). On the other hand, if the device does include an integrated GPS device, then decision 345 branches to "yes" branch 358 whereupon the device's position coordinates are retrieved from the integrated GPS device (step 360).

Once the device's GPS coordinates have been retrieved, the device's prior location is retrieved from configuration table 310 (step 365). A determination is made as to whether the newly acquired GPS location data is different from the stored GPS location data (decision 370). If the location has changed, decision 370 branches to "yes" branch 372 whereupon the new GPS location data is stored (step 375) in configuration table 310. On the other hand, if the location has not changed, decision 370 branches to "no" branch 378 bypassing the storage of the location data since it has not changed.

Figure 5:
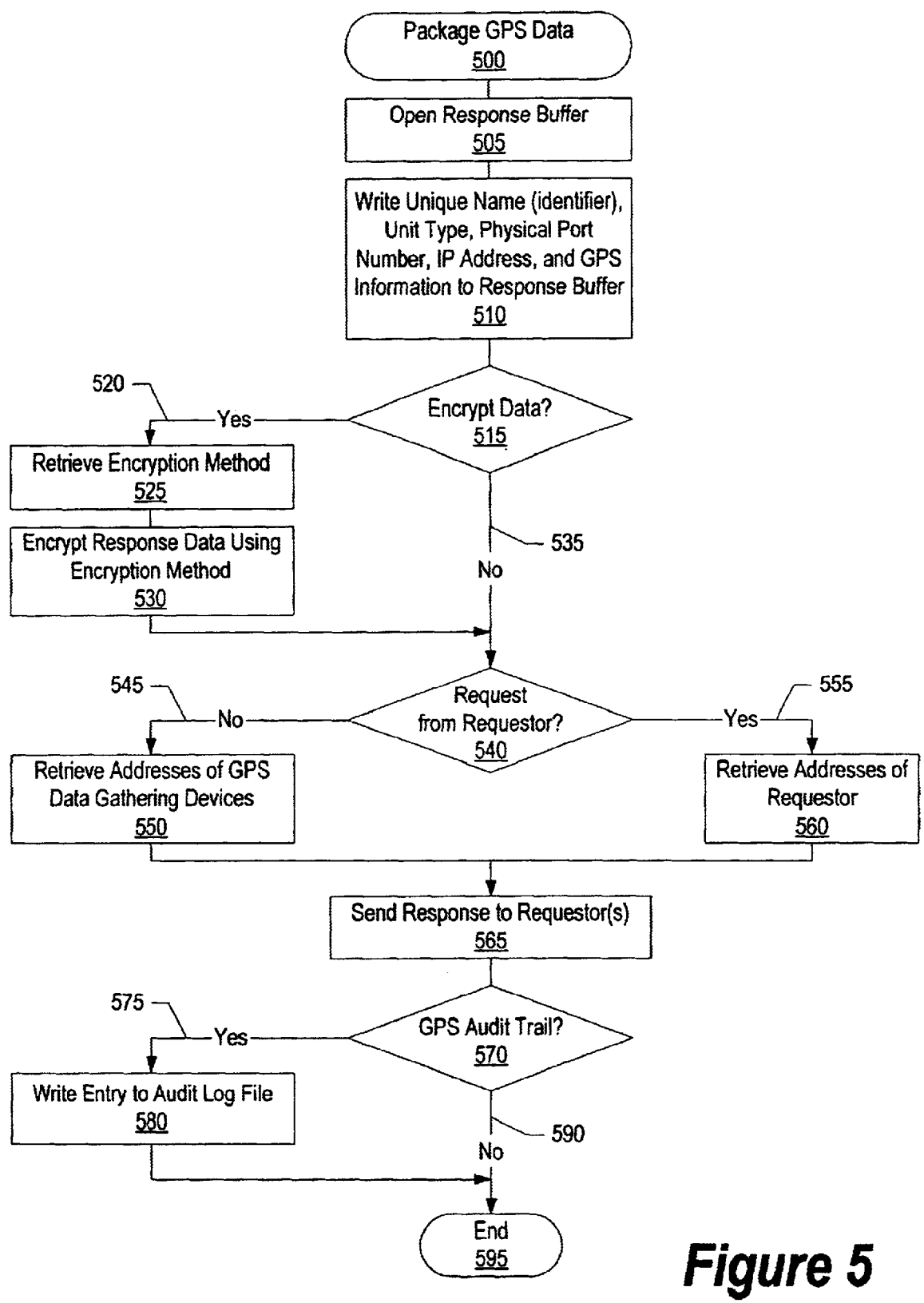
FIG. 5 is a flowchart of a device packaging GPS data and returning it to a requestor.

The GPS location data is packaged and returned to the requestor (predefined process 380, see FIG. 5 for further details). A determination is made as to whether there are more GPS requests to process (decision 385). If there are more requests to process, decision 385 branches to "yes" branch 390 which loops back to handle the next request. This looping continues until there are no more requests to handle (i.e., the device is shut down or the GPS feature is disabled), at which point decision 385 branches to "no" branch 392 and processing 395.

FIG. 4 is a flowchart of a device waiting for GPS events and replying with GPS data. Processing commences at 400 whereupon a determination is made as to whether a GPS request has been received (decision 405). If a GPS request has been received, decision 405 branches to "yes" branch 410 whereupon the request is received. In a Fibre Channel embodiment, Fibre Channel messages are sent using Extended Link Services (ELS) that allow a Fibre Channel port on one device to request a function or service from another port (i.e., on another device). In general, the ELSes are independent of the Upper Level Protocol being used (e.g., SCSI and IP protocols). Requestor 420 issues location request 425 to the device. In one embodiment, location request 425 is the Request Node Identification Data (RNID) ELS. In this embodiment, the RNID ELS is used by requestor 420 to acquire node-identification data from another device on the Fibre Channel fabric. Two general types of node identification requests are used by Fibre Channel devices: (1) common node-identification data, and (2) specific node identification data. Common-node identification data is the same for all types of ports, while the specific node-identification data varies depending on the type of Fibre Channel port which is being contacted (i.e., SCSI over Fibre Channel, IP over Fibre Channel, etc.).

In one embodiment, the Topology Discovery RNID type (hex value of 0xDF according to FC-FS and FC-GS-3 proposed standards) is used for GPS coordinate requests. This RNID type reports information such as the device's World Wide (unique) Name, Unit Type (i.e., switch, gateway, storage subsystem, etc.), physical port number, IP address (if applicable), etc. Reserved fields in the response payload are used to include GPS coordinates. In another embodiment, additional fields are added to the response payload of this RNID type to include the GPS coordinate information.

On the other hand, if a request has not been received, decision 405 branches to "no" branch 430 whereupon a wait state is entered (step 435) so that GPS information is periodically gathered (i.e., every minute) regardless of whether there are pending GPS requests.

The current GPS data corresponding to the device is gathered (step 440, see FIG. 3, steps 345 to 360 for alternate methods of retrieving GPS information). A determination is made (decision 445) as to whether the retrieved GPS coordinates are the same as the last GPS coordinates that were retrieved (i.e., determine whether the device has been recently moved). If the location information is not the same, decision 445 branches to "no" branch 465 whereupon the data is packaged and returned to the requester (predefined process 470, see FIG. 5 for further details). On the other hand, if the location has not changed, decision 445 branches to "yes" branch 450 whereupon a determination is made as to whether the GPS event was a request from a requestor or the event was a periodic wakeup event (decision 455). If the request was a request from a requestor, decision 455 branches to "yes" branch 460 whereupon the data is packaged and returned to the requestor to respond to the request (predefined process 470, see FIG. 5 for further details). On the other hand, if the GPS data was retrieved in response to a wakeup event (i.e., no requestor requested the GPS data), then decision 455 branches to "no" branch 475 which bypasses returning the request to the requestor(s).

A determination is made as to whether GPS event processing should continue (decision 480). If processing should continue, decision 480 branches to "yes" branch 485 which loops back to process the next GPS event. This looping continues until GPS event processing terminates (i.e., GPS processing is disabled or the device is shutdown), whereupon decision 480 branches to "no" branch 490 and processing ends at 495.

FIG. 5 is a flowchart of a device packaging GPS data and returning it to one or more requesters. Processing commences at 500 whereupon a buffer is created (step 505) for storing responsive GPS data. Responsive data, such as the device's unique (i.e. World Wide) name, unit type (i.e., switch, gateway, storage subsystem, physical port number, IP address, and GPS coordinate data are written to the created response buffer (step 510).

A determination is made, based on configuration options, as to whether the responsive packet should be encrypted to secure the information from eavesdroppers (decision 515). If the data is to be encrypted, decision 515 branches to "yes" branch 520 whereupon the encryption method (i.e., public key—private key, shared password, etc.) is retrieved from configuration information (step 525) and the responsive data is encrypted using the retrieved method (step 530). On the other hand, if the data is not encrypted, decision 515 branches to "no" branch 535 bypassing the encryption steps.

A determination is made as to whether the GPS event is a request from a requestor or an event triggered because the device has been moved (decision 540). If the event is not a request from a requesting device, decision 540 branches to "no" branch 545 whereupon the destination addresses are retrieved from a configuration data area that includes addresses of one or more GPS data gathering devices. On the other hand, if the event is a request from a requesting device, decision 540 branches to "yes" branch 555 whereupon the destination address is set to the address of the requesting device (step 560).

The responsive data is sent to the requestor or data gatherer(s) (step 565). In one embodiment, the Topology Discovery RNID type is used for GPS coordinate responses. This RNID type reports information such as the device's World Wide (unique) Name, Unit Type (i.e., switch, gateway, storage subsystem, etc.), physical port number, IP address (if applicable), etc. Reserved fields in the response payload are used to include GPS coordinates. In another embodiment, additional fields are added to the response payload of this RNID type to include the GPS coordinate information.

A determination is made as to whether a GPS audit trail is maintained (decision 570). If an audit trail is maintained, decision 570 branches to "yes" branch 575 whereupon an entry is written to an audit log file (step 580). Information is maintained regarding the device's GPS coordinates as well as information regarding GPS requests made to the device (i.e., requesting device names and addresses, timestamps of requests, etc.). On the other hand, if an audit trail is not maintained, decision 570 branches to "no" branch 590. Processing thereafter ends at 595.

Figure 6:
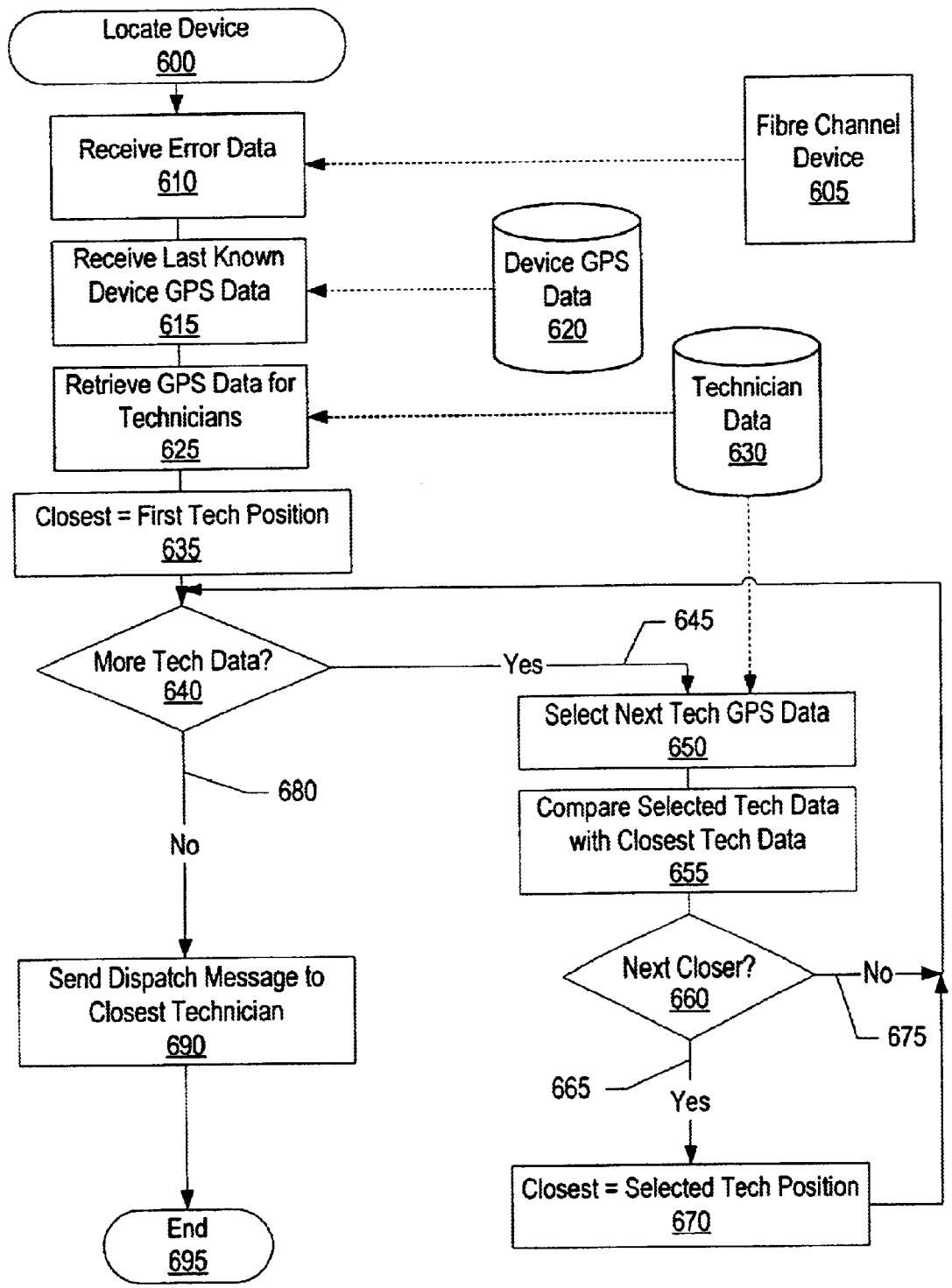
FIG. 6 is a flowchart showing steps taken to match a disabled device with a nearby technician.

FIG. 6 is a flowchart showing steps taken to match a disabled device with a nearby technician. Devices in a network, such as a Fibre Channel fabric, can be disbursed across a wide area. Devices can be located in various cities or countries. While organizations may keep track of device locations using conventional non-GPS methods, devices are often moved from one location to another. These movements are not always recorded with asset management. In addition, a given location may be a building or campus whereby devices can be difficult to locate even with current information. GPS data tracked as described herein can be used to pinpoint the exact location of devices. One example of locating devices is for maintaining and repairing devices. FIG. 6 illustrates steps used to locate such devices.

Processing commences at 600 whereupon data, such as an error condition, is received (step 610). The data may be from another device, such as Fibre Channel device 605 (i.e., an faulty device may have been discovered when another device attempted to access or use it). The last known GPS coordinates pertaining to the device are retrieved (step 615) from device GPS data 620. GPS coordinate data pertaining to technicians that can respond to the faulty device is retrieved (step 625) by polling the various technicians (using technician data 630) who are each carrying a GPS receiver or have a GPS receiver in their vehicle. The available technicians are processed in order to determine which technician is closest to the device.

A variable "closest_tech" is initialized to the first technician's GPS coordinate position (step 635). A determination is made as to whether there are more technicians to process (decision 640). If there are more technicians, decision 640 branches to "yes" branch 645 whereupon the next technician is selected (step 650). The distance between the device and the current "closest_tech" position is compared with the distance between the device and the selected technician (step 655). A determination is made as to whether the selected technician is closer to the device than the current "closest_tech" (decision 660). If the selected technician is closer, decision 660 branches to "yes" branch 665 whereupon the "closest_tech" is set to the coordinates of the selected technician (step 670). On the other hand, if the selected technician is not closer, decision 660 branches to "no" branch 675 whereupon the "closest_tech" is not changed.

Processing loops back to decision 640 in order to determine whether there are more technicians to process. This looping continues until there are no more technicians to process, at which point decision 640 branches to "no" branch 680. A dispatch message is sent to the technician that is closest to the device (step 690). Processing thereafter ends at 695.

Figure 7:
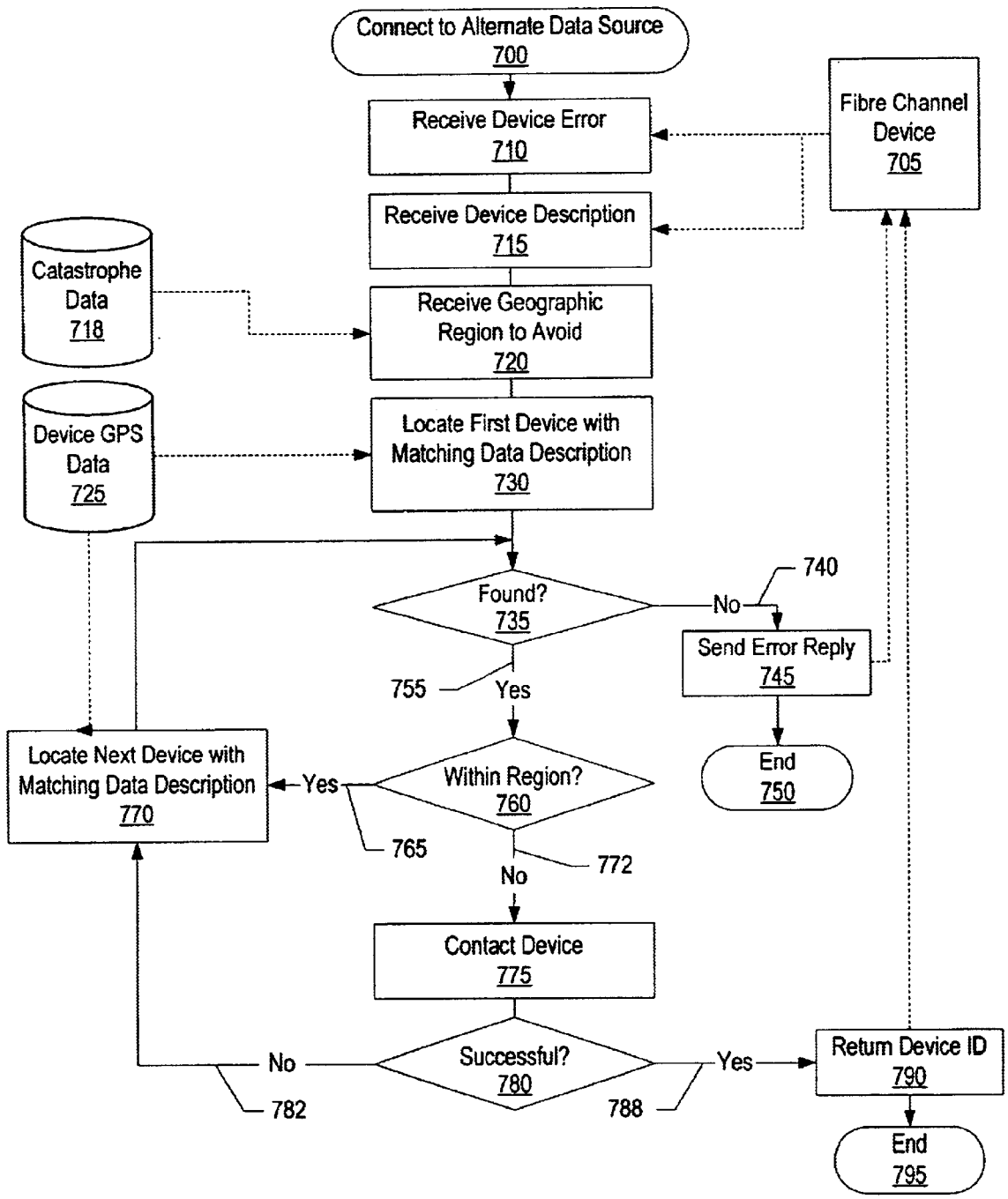
FIG. 7 is a flowchart showing steps taken to connect to an alternate data source using GPS data to avoid a geographic region.

FIG. 7 is a flowchart showing steps taken to connect to an alternate data source using GPS data to avoid a geographic region. In a large scale catastrophe, many devices may be disabled or decoupled from the network. Other devices may be configured to perform the exact or similar function to a disabled device. For example, a storage subsystem may have shadow copies located in various places around the country and the world. A storage subsystem in France may have a shadow copy maintained in the United States and other parts of Europe. If the French storage subsystem is disabled due to a catastrophe affecting large portions of Europe, then an alternative storage subsystem, such as the one in the United States, may be accessed by devices that normally use storage subsystems in Europe. FIG. 7 shows an example flowchart of how the GPS data gathered as shown in this application is used to identify and connect to an alternative device.

Processing commences at 700 whereupon a device error is received (step 710) pertaining to a particular device desired by another device, such as Fibre Channel device 705. The desired device description is received from device 705 (step 715). For example, the device description may be the payroll storage subsystem. A geographic region to avoid is provided (step 720). The information may be manually entered or may be retrieved from a data store describing the catastrophe and areas to avoid as a result of the catastrophe, such as catastrophe data store 718.

Device GPS data 725 includes GPS coordinate data and other identifying information regarding devices, including the device descriptions. For example, Device GPS data store 725 would indicate which devices include a copy of the payroll storage subsystem.

The first device matching the description desired by requesting device 705 is retrieved (step 730). A determination is made as to whether a matching device was found (decision 735) in device GPS data 725. If a device was not found, decision 735 branches to "no" branch 740 whereupon an error is returned to the requesting device (step 745) and processing ends at 750. On the other hand, if a device was found, decision 735 branches to "yes" branch 755 whereupon a determination is made as to whether the located device is within the geographic region to avoid (decision 760).

If the device is within the geographic region to avoid, decision 760 branches to "yes" branch 765 whereupon the next device matching the desired description is retrieved (step 770) from device GPS data 725 and processing loops back to process the next device. On the other hand, if the device is not within the geographic region to avoid, decision 760 branches to "no" branch 772 whereupon an attempt is made to contact the device (step 775).

A determination is made as to whether the connection was successful (decision 780). If the connection was successful, decision 780 branches to "yes" branch 788 whereupon the located device identifying information is returned to the requesting device (step 790) and processing ends at 795. On the other hand, if the connection was not successful, decision 780 branches to "no" branch 782 which locates the next device with a matching description (step 770) and processing loops back to process the next device. This looping continues until all matching devices have been processed to no avail (i.e., decision 735 branches to "no" branch 740), or a matching device has been located (i.e., decision 780 branches to "yes" branch 788).

Figure 8:
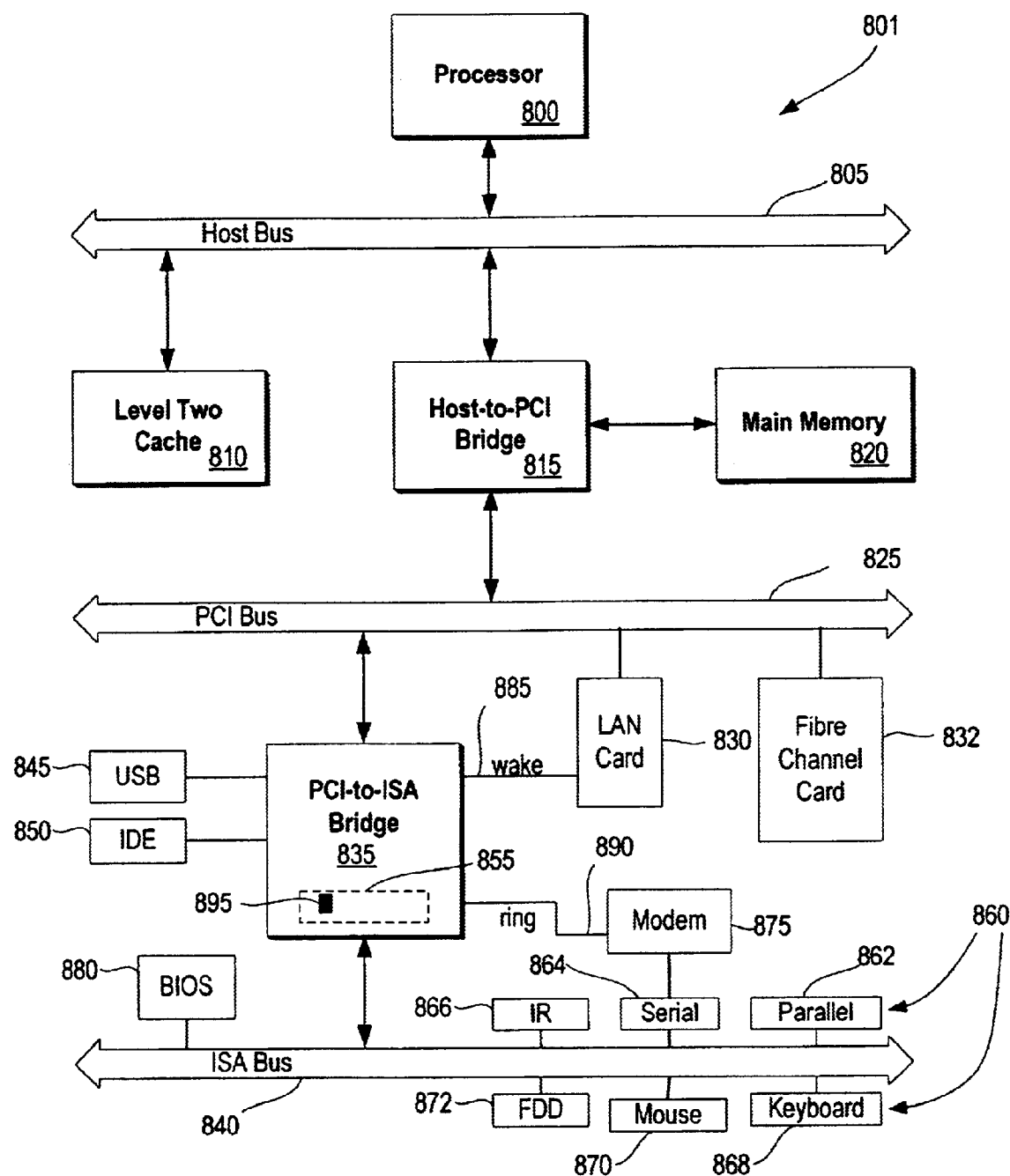
FIG. 8 is a block diagram of an information handling system capable of implementing the present invention.

FIG. 8 illustrates information handling system 801 which is a simplified example of a computer system capable of performing the present invention. Computer system 801 includes processor 800 which is coupled to host bus 805. A level two (L2) cache memory 810 is also coupled to the host bus 805. Host-to-PCI bridge 815 is coupled to main memory 820, includes cache memory and main memory control functions, and provides bus control to handle transfers among PCI bus 825, processor 800, L2 cache 810, main memory 820, and host bus 805. PCI bus 825 provides an interface for a variety of devices including, for example, LAN card 830 and Fibre Channel Card 832. PCI-to-ISA bridge 835 provides bus control to handle transfers between PCI bus 825 and ISA bus 840, universal serial bus (USB) functionality 845, IDE device functionality 850, power management functionality 855, and can include other functional elements not shown, such as a real-time clock (RTC), DMA control, interrupt support, and system management bus support. Peripheral devices and input/output (I/O) devices can be attached to various interfaces 860 (e.g., parallel interface 862, serial interface 864, infrared (IR) interface 866, keyboard interface 868, mouse interface 870, and fixed disk (FDD) 872) coupled to ISA bus 840. Alternatively, many I/O devices can be accommodated by a super I/O controller (not shown) attached to ISA bus 840.

BIOS 880 is coupled to ISA bus 840, and incorporates the necessary processor executable code for a variety of low-level system functions and system boot functions. BIOS 880 can be stored in any computer readable medium, including magnetic storage media, optical storage media, flash memory, random access memory, read only memory, and communications media conveying signals encoding the instructions (e.g., signals from a network). In order to attach computer system 801 another computer system to copy files over a network, LAN card 830 is coupled to PCI-to-ISA bridge 835. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing methods, or processes, described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for identifying a device location in a computer network that includes a Fibre Channel fabric, said method comprising:

receiving, at a first device, a Fibre Channel request from a second device;

identifying one or more GPS coordinates in response to receiving the request;

writing the GPS coordinates and device identification information corresponding to the first device to a response payload; and transmitting the response payload through the computer network to the second device.

2. The method as described in claim 1 wherein the Fibre Channel request is a Fibre Channel Request Node Identification Data request.

3. The method as described in claim 1 a wherein the device identification information includes at least one of the identifiers selected from the group consisting of a World Wide Name, a unit type, a physical port number, and an IP address.

4. The method as described in claim 1 further comprising:

identifying a requestor identifier corresponding to the second device;

comparing the requester identifier to one or more authorized requester identifiers; and validating the GPS event in response to the comparison.

5. The method as described in claim 1 further comprising:

repeatedly identifying the GPS coordinates on a time interval basis;

comparing the identified GPS coordinates with one or more previously stored GPS coordinates;

determining whether the device has been moved based on the comparison; and transmitting the response payload in response to determining that the device has been moved.

6. The method as described in claim 1 further comprising:

retrieving an encryption method; and encrypting the response payload upon the retrieved encryption method.

7. The method as described in claim 1 further comprising:

receiving the response payload at the second device;

storing the response payload in a GPS storage area accessible to the second device, wherein the GPS storage area includes coordinates for a plurality of devices;

receiving catastrophe data, the catastrophe data including a catastrophe area defined by a plurality of catastrophe GPS coordinates;

comparing the catastrophe GPS coordinates to the plurality of packaged coordinates stored in the GPS storage area;

determining which of the devices are within the catastrophe area based on the comparison; and determining which of the devices are outside the catastrophe area based on the comparison.

8. An information handling system comprising:

one or more processors;

a memory accessible by the processors;

a nonvolatile storage device accessible by the processors;

a GPS receiving device accessible by the processors;

a network adapter operable to connect the information handling system to a computer network that includes a Fibre Channel fabric;

a Fibre Channel adapter connecting the information handling device to the Fibre Channel fabric; and a device identification tool for locating a device in a computer network, the device identification tool including:

means for receiving, at the information handling system, a Fibre Channel request from a second device;

means for identifying one or more GPS coordinates from the GPS receiving device in response to receiving the request;

means for writing the GPS coordinates and device identification information corresponding to the first device to a response payload; and means for transmitting the response payload through the computer network to the second device.

9. The information handling system as described in claim 8 wherein the Fibre Channel request is a Fibre Channel Request Node Identification Data request.

10. The information handling system as described in claim 8 wherein the device identification information includes at least one of the identifiers selected from the group consisting of a World Wide Name, a unit type, a physical port number, and an IP address.

11. The information handling system as described in claim 8 further comprising:

means for identifying a requestor identifier corresponding to the second device;

means for comparing the requestor identifier to one or more authorized requestor identifiers; and means for validating the GPS event in response to the comparison.

12. The information handling system as described in claim 8 further comprising:

means for repeatedly identifying the GPS coordinates on a time interval basis;

means for comparing the identified GPS coordinates with one or more previously stored GPS coordinates;

means for determining whether the device has been moved based on the comparison; and means for transmitting the response payload in response to determining that the device has been moved.

13. The information handling system as described in claim 8 further comprising:

means for receiving the response payload at the second device;

means for storing the response payload in a GPS storage area accessible to the second device, wherein the GPS storage area includes coordinates for a plurality of devices;

means for receiving catastrophe data, the catastrophe data including a catastrophe area defined by a plurality of catastrophe GPS coordinates;

means for comparing the catastrophe GPS coordinates to the plurality of packaged coordinates stored in the GPS storage area;

means for determining which of the devices are within the catastrophe area based on the comparison; and means for determining which of the devices are outside the catastrophe area based on the comparison.

14. A computer program product stored on a computer operable medium for identifying a device location in a computer network that includes a Fibre Channel fabric, said computer program product comprising:

means for receiving, at a first device, a Fibre Channel request from a second device;

means for identifying one or more GPS coordinates in response to receiving the request;

means for writing the GPS coordinates and device identification information corresponding to the first device to a response payload; and means for transmitting the response payload through the computer network to the second device.

15. The computer program product as described in claim 14 wherein the Fibre Channel request is a Fibre Channel Request Node Identification Data request.

16. The computer program product as described in claim 14 wherein the device identification information includes at least one of the identifiers selected from the group consisting of a World Wide Name, a unit type, a physical port number, and an IP address.

17. The computer program product as described in claim 14 further comprising:

means for identifying a requester identifier corresponding to the second device;

means for comparing the requester identifier to one or more authorized requester identifiers; and means for validating the GPS event in response to the comparison.

18. The computer program product as described in claim 14 further comprising:

means for repeatedly identifying the GPS coordinates on a time interval basis;

means for comparing the identified GPS coordinates with one or more previously stored GPS coordinates;

means for determining whether the device has been moved based on the comparison; and means for transmitting the response payload in response to determining that the device has been moved.

19. The computer program product as described in claim 14 further comprising:

means for retrieving an encryption method; and means for encrypting the response payload based upon the retrieved encryption method.

20. The computer program product as described in claim 14 further comprising:

means for receiving the response payload at the second device;

means for storing the response payload in a GPS storage area accessible to the second device, wherein the GPS storage area includes coordinates for a plurality of devices;

means for receiving catastrophe data, the catastrophe data including a catastrophe area defined by a plurality of catastrophe GPS coordinates;

means for comparing the catastrophe GPS coordinates to the plurality of packaged coordinates stored in the GPS storage area;

means for determining which of the devices are within the catastrophe area based on the comparison; and means for determining which of the devices are outside the catastrophe area based on the comparison.

21. A method for identifying a device location in a computer network said method comprising:

receiving a GPS event;

identifying one or more GPS coordinates in response to receiving the event;

packaging the GPS coordinates;

transmitting the packaged coordinates through the computer network to a second device;

receiving the packaged coordinates at the second device;

storing the packaged coordinates in a GPS storage area accessible to the second device, wherein the GPS storage area includes packaged coordinates for a plurality of devices;

receiving catastrophe data, the catastrophe data including a catastrophe area defined by a plurality of catastrophe GPS coordinates;

comparing the catastrophe GPS coordinates to the plurality of packaged coordinates stored in the GPS storage area;

determining which of the devices are within the catastrophe area based on the comparison; and determining which of the devices are outside the catastrophe area based on the comparison.

22. An information handling system comprising:

one or more processors;

a memory accessible by the processors;

a nonvolatile storage device accessible by the processors;

a GPS receiving device accessible by the processors;

a network adapter operable to connect the information handling system to a computer network; and a device identification tool for locating a device in a computer network, the device identification tool including:

means for receiving a GPS event;

means for identifying one or more GPS coordinates from the GPS receiving device in response to receiving the event;

means for packaging the GPS coordinates; and means for transmitting the packaged coordinates through the computer network to a second device;

means for receiving the packaged coordinates at the second device;

means for storing the packaged coordinates in a GPS storage area accessible to the second device, wherein the GPS storage area includes packaged coordinates for a plurality of devices;

means for receiving catastrophe data, the catastrophe data including a catastrophe area defined by a plurality of catastrophe GPS coordinates;

means for comparing the catastrophe GPS coordinates to the plurality of packaged coordinates stored in the GPS storage area;

means for determining which of the devices are within the catastrophe area based on the comparison; and means for determining which of the devices are outside the catastrophe area based on the comparison.

23. A computer program product stored on a computer operable medium for identifying a device location in a computer network, said computer program product comprising:

means for receiving a GPS event;

means for identifying one or more GPS coordinates in response to receiving the event;

means for packaging the GPS coordinates;

means for transmitting the packaged coordinates through the computer network to a second device;

means for receiving the packaged coordinates at the second device;

means for storing the packaged coordinates in a GPS storage area accessible to the second device, wherein the GPS storage area includes packaged coordinates for a plurality of devices;

means for receiving catastrophe data, the catastrophe data including a catastrophe area defined by a plurality of catastrophe GPS coordinates;

means for comparing the catastrophe GPS coordinates to the plurality of packaged coordinates stored in the GPS storage area;

means for determining which of the devices are within the catastrophe area based on the comparison; and means for determining which of the devices are outside the catastrophe area based on the comparison.

* * * * *